(No Model.) 2 Sheets—Sheet 2.
J. C. COGHILL & C. H. UNSELT.
COMBINED FERTILIZER DROPPER AND HILL FORMER FOR TOBACCO PLANTS.
No. 360,205. Patented Mar. 29, 1887.
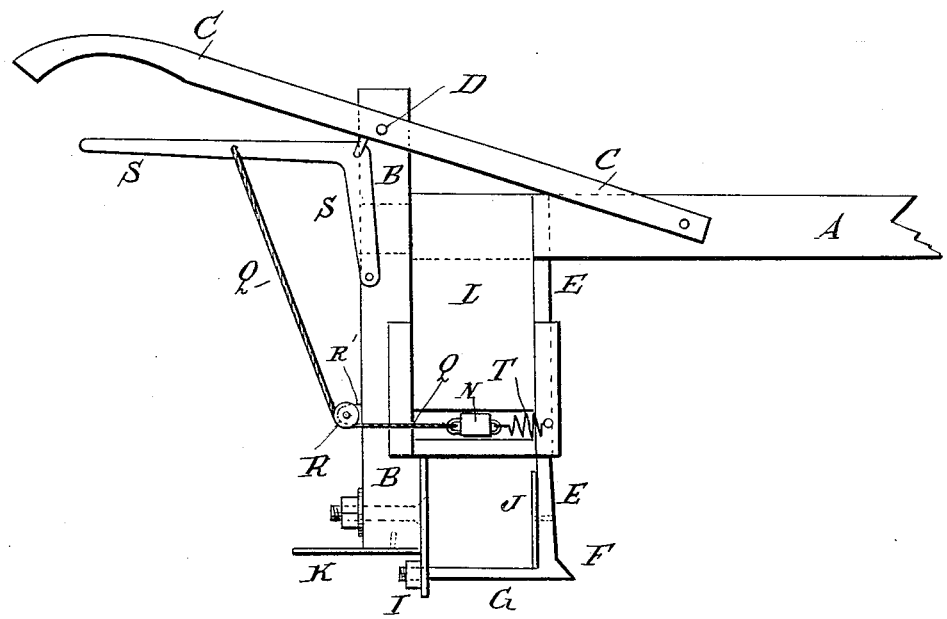
Fig: 5.
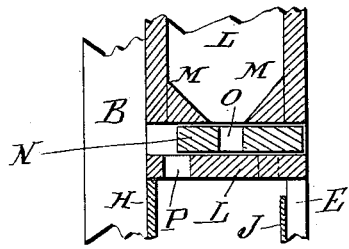
Fig: 6.
WITNESSES:
INVENTOR:
BY
ATTORNEYS.

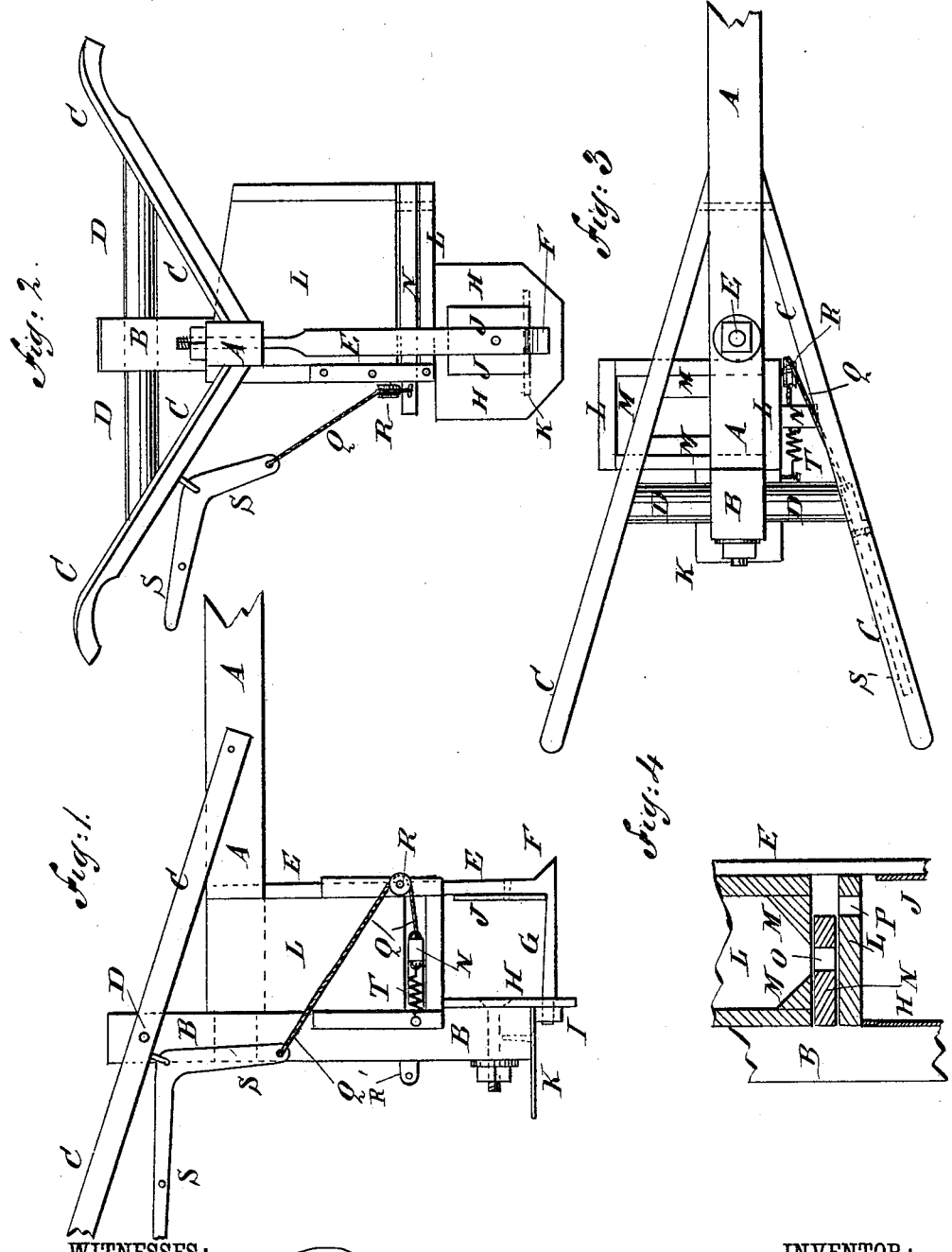

UNITED STATES PATENT OFFICE.

JOHN C. COGHILL AND CHARLES H. UNSELT, OF PADUCAH, KENTUCKY.

COMBINED FERTILIZER-DROPPER AND HILL-FORMER FOR TOBACCO-PLANTS.

SPECIFICATION forming part of Letters Patent No. 360,205, dated March 29, 1887.

Application filed July 26, 1886. Serial No. 209,116. (No model.)

*To all whom it may concern:*

Be it known that we, JOHN COLMAN COGHILL and CHARLES H. UNSELT, both of Paducah, in the county of McCracken and State of Kentucky, have invented a new and useful Improvement in Combined Fertilizer-Droppers and Hill-Formers for Tobacco-Plants, of which the following is a full, clear, and exact description.

Reference is to be had to the accompanying drawings, forming a part of this specification, in which similar letters of reference indicate corresponding parts in all the figures.

Figure 1 is a side elevation of the machine, parts being broken away. Fig. 2 is a front elevation of the same. Fig. 3 is a plan view of the same, part being broken away. Fig. 4 is a sectional side elevation of a part of the same, showing the arrangement of the fertilizer-dropping apertures, and Figs. 5 and 6 illustrate a modified arrangement of the seed-dropping devices.

The object of this invention is to provide combined fertilizer-droppers and hill-formers for tobacco-plants, constructed in such a manner that the fertilizer can be dropped at the proper places, covered with soil to form a hill, and the soil packed to form places for the plants, and which shall be simple in construction and convenient in use.

The invention consists in the construction and combination of various parts of the machine, as will be hereinafter fully described.

A represents a beam, to the rear end of which is attached a vertical standard, B. To the opposite sides of the middle part of the beam A are secured the forward ends of the handles C, the rear parts of which are supported and held in the desired position by the round D, attached at its ends to the said handles C, and attached at its center to the upwardly-projecting end of the standard B.

To the beam A, at a little distance from the standard B, is secured the upper end of the upright bar E, upon the forward side of the lower end of which is formed, or to it is attached, a point, F, to cause the said end to enter the soil readily. Upon the rear side of the lower end of the upright bar E is formed, or to it is attached, the forward end of a horizontal bar, G, the rear end of which passes through the lower part of the plate H, and has a nut, I, screwed upon it, or is secured to the said plate by other suitable means. The plate H is vertical, and is secured to the forward side of the lower end of the standard B by a bolt or other suitable means. To the rear side of the lower part of the upright bar E is secured, by a bolt or other suitable means, a vertical plate, J, of a less size than the plate H, as shown in Fig. 2. To the lower end of the standard B is attached a horizontal plate, K, as shown in full lines in Fig. 1 and in dotted lines in Fig. 2.

To the beam A and the standard B is secured a box or hopper, L, to receive the fertilizer. To the inner sides of the lower parts of the sides and ends of the hopper L are attached triangular cleats M, to guide the fertilizer into the center of the lower part of the said hopper, where it rests upon the dropping-plate N. The dropping-plate N rests upon the bottom of the hopper L beneath the cleats M, and is pivoted near one end to the said bottom, as indicated in dotted lines in Fig. 2. In the plate N, near its free end, is formed an aperture, O, to receive the fertilizer and carry it to the discharge-aperture P, formed through the hopper-bottom beneath the forward cleat, M, so that no more of the fertilizer can escape through the aperture P than is carried to it by the aperture in the plate N. The free end of the plate N projects, and to it is attached the end of a cord or chain, Q, which passes around a guide-pulley, R, pivoted to the lower forward corner of the hopper L. The other end of the cord Q is attached to the lower arm of the elbow-lever S, which is pivoted at its angle by a staple or other suitable means to the handle C, in such a position that its upper arm can be readily grasped and operated by the hand that holds the said handles to move the free end of the plate N forward and drop the fertilizer. When the lever S is released, the dropping-plate N is drawn back, to again receive fertilizer, by a spiral or other spring, T, one end of which is connected with the free end of the said slide, and its other end is attached to the lower rear corner of the hopper L, or other suitable support.

In using the machine the land is marked with cross-marks, across which the machine is drawn at right angles. As the machine is drawn forward the plate J brushes aside the lumps and crowds and pushes the soil before it, forming a small bank, while at the same time the plate H pushes soil before it, forming a larger bank. As each cross-mark is reached the lever S is operated to drop the fertilizer, which is scattered by falling upon the bar G, and at the same time the machine is raised, causing the plate J to pass over the soil pushed before it, and causing the plate H to carry forward the upper part of the soil pushed before it, cover the fertilizer, and form a hill to receive the tobacco-plants. As the plate H passes the cross-mark the machine is lowered, bringing the plate K down upon the top of the hill, marking the hill, and packing the soil, so that it will not fall in and fill the hole formed by the peg before the plant has been placed in the said hole.

In the modification shown in Figs. 5 and 6 the aperture P in the bottom of the hopper L is formed beneath the rear cleat, M, and the guide-pulley R is pivoted to an arm, R', extending from the standard B, the cord Q in this case being attached to the upper arm of the elbow-lever S and the spring T being arranged at the opposite side of the plate N; otherwise the arrangement of the machine is the same.

When the parts are arranged as in Figs. 1 to 4, the fertilizer will be dropped in the check and the operation will be as hereinbefore described; but when the arrangement is as shown in Figs. 5 and 6 the fertilizer will be dropped just as the machine is passing over the check, and the plate H will roll it onto the next check. Two holes, P, may be formed in the bottom of the hopper L, as shown in full and dotted lines in Fig. 6, and the machine be constructed for use either way.

Having thus described our invention, what we claim as new, and desire to secure by Letters Patent, is—

1. The combination, with the beam A and the standard B, of the upright bar E, secured to the beam in front of the standard, and provided with the point F and rearwardly-projecting bar G, the plate H, secured to the standard B and to the bar G, and the plate J, secured to the upright bar E, substantially as herein shown and described.

2. The combination, with the beam A, the standard B, the hopper L, and a fertilizer-dropping mechanism, of the upright bar E, having a point, F, at its lower end, the horizontal bar G, connected with the lower end of the bar E, the plates H K, attached to the standard B, and the plate J, attached to the bar E, substantially as herein shown and described, whereby the fertilizer can be covered, hills formed to receive the tobacco-plants, and the soil of the said hills packed, as set forth.

JOHN C. COGHILL.
CHARLES H. UNSELT.

Witnesses:
M. V. CHERRY,
J. T. POWELL.